United States Patent
Wen

(10) Patent No.: US 11,539,980 B1
(45) Date of Patent: Dec. 27, 2022

(54) IMAGE SLICE TRANSFORMING METHOD AND ELECTRONIC DEVICE

(71) Applicant: HTC Corporation, Taoyuan (TW)

(72) Inventor: Yu-You Wen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/398,007

(22) Filed: Aug. 10, 2021

(51) Int. Cl.
  *H04N 19/60* (2014.01)
  *H04N 19/174* (2014.01)
  *H04N 19/169* (2014.01)
  *H04N 19/119* (2014.01)

(52) U.S. Cl.
  CPC ........... *H04N 19/60* (2014.11); *H04N 19/119* (2014.11); *H04N 19/174* (2014.11); *H04N 19/188* (2014.11)

(58) Field of Classification Search
  CPC .... H04N 19/60; H04N 19/119; H04N 19/174; H04N 19/188
  See application file for complete search history.

(56) References Cited

U.S. PATENT DOCUMENTS

2014/0198839 A1    7/2014  Potdar et al.
2019/0123833 A1*   4/2019  Chiu ...................... H04N 19/44

FOREIGN PATENT DOCUMENTS

CN        112703736         4/2021
TW        201918067         5/2019
WO    WO-2020056357 A1 *    3/2020  ........... H04N 19/119

OTHER PUBLICATIONS

"Office Action of Taiwan Counterpart Application", dated Feb. 25, 2022, p. 1-p. 11.

* cited by examiner

*Primary Examiner* — Tat C Chio
(74) *Attorney, Agent, or Firm* — JCIPRNET

(57) ABSTRACT

The embodiments of the disclosure provide an image slice transforming method and an electronic device. The method includes: receiving an i-th image slice outputted by an image encoder, wherein the i-th image slice belongs to N image slices divided from an image frame, i is an index, and N is an integer; obtaining a slice header of the i-th image slice; transforming the i-th image slice into an i-th sub-frame by modifying the slice header of the i-th image slice.

18 Claims, 4 Drawing Sheets

IMAGE SLICE TRANSFORMING METHOD AND ELECTRONIC DEVICE

BACKGROUND OF THE INVENTION

1. Field of the Invention

The disclosure generally relates to an image transforming mechanism, in particular, to an image slice transforming method and an electronic device.

2. Description of Related Art

See FIG. 1, which shows a general video streaming mechanism. As shown in FIG. 1, general video streaming is frame based, in which the image frame can only be decoded after the encoder has outputted the encoded image frame. In this case, the subsequent process (e.g., rendering) would be blocked until the encoder has outputted the image frame, which makes the latency longer.

In some image processing specifications (e.g., H.264), although the encoder could output image slices of the image frame, the subsequent process still needs to wait until all image slices of the image frame have been outputted by the encoder, which might lead to longer latency.

SUMMARY OF THE INVENTION

Accordingly, the disclosure is directed to an image slice transforming method and an electronic device, which may be used to solve the above technical problem.

The embodiments of the disclosure provide an image slice transforming method, adapted to an electronic device. The method includes: receiving an i-th image slice outputted by an image encoder, wherein the i-th image slice belongs to N image slices divided from an image frame, i is an index, and N is an integer; obtaining a slice header of the i-th image slice; transforming the i-th image slice into an i-th sub-frame by modifying the slice header of the i-th image slice.

The embodiments of the disclosure provide an electronic device including a storage circuit and a processor. The storage circuit stores a program code. The processor is coupled to the non-transitory storage circuit and accesses the program code to perform: receiving an i-th image slice outputted by an image encoder, wherein the i-th image slice belongs to N image slices divided from an image frame, i is an index, and N is an integer; obtaining a slice header of the i-th image slice; transforming the i-th image slice into an i-th sub-frame by modifying the slice header of the i-th image slice.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
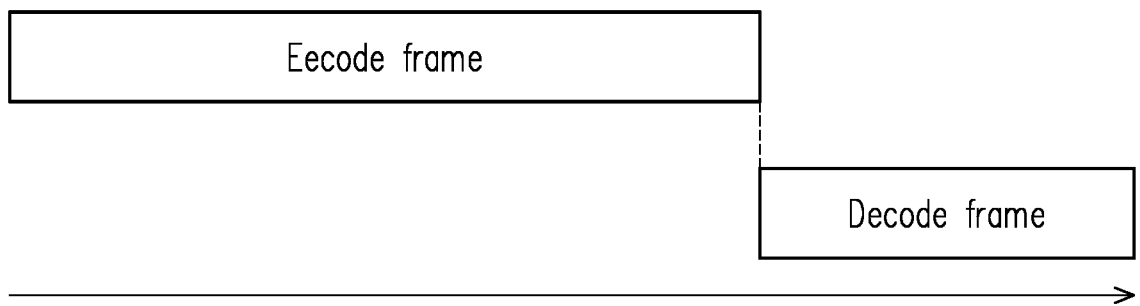
FIG. 1 shows a general video streaming mechanism.

Reference will now be made in detail to the present preferred embodiments of the invention, examples of which are illustrated in the accompanying drawings. Wherever possible, the same reference numbers are used in the drawings and the description to refer to the same or like parts.

Figure 2:
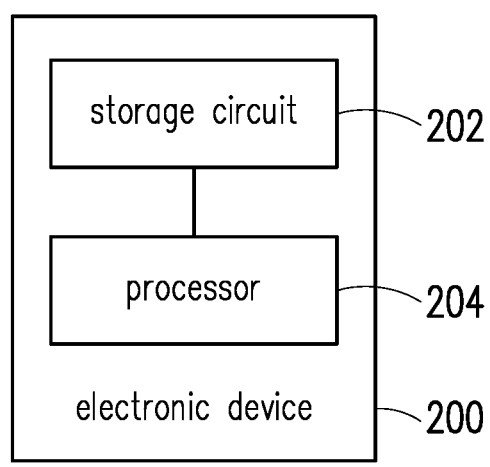
FIG. 2 shows a schematic diagram of an electronic device according to an exemplary embodiment of the disclosure.

See FIG. 2, which shows a schematic diagram of an electronic device according to an exemplary embodiment of the disclosure. In some embodiments, the electronic device 200 may be any computer device and/or a smart device, and the electronic device 200 may belong to a video streaming system including a transmitter and a receiver. In one embodiment, the electronic device 200 may be the transmitter of the video streaming system. In this case, the electronic device 200 may generate image frames and use an image encoder to encode the image frames. Afterwards, the electronic device 200 may transmit the image frames to the receiver for the image frames to decode and show the image frames as visual contents.

In one embodiment, the electronic device 200 may be the receiver of the video streaming system. In this case, the electronic device 200 may receive the encoded image frames from the transmitter of the video streaming system, and the electronic device 200 may decode and show the image frames as visual contents.

In various embodiments, the mechanism of the transmitter and the receiver to encode/decode image frames may be performed based on any known image encoding/decoding algorithms. For better understanding the concept of the disclosure, H.264 would be used as an example of the image encoding/decoding algorithm used by the transmitter and the receiver, but the disclosure is not limited thereto.

In FIG. 2, the electronic device 200 includes a storage circuit 202 and a processor 204. The storage circuit 202 is one or a combination of a stationary or mobile random access memory (RAM), read-only memory (ROM), flash memory, hard disk, or any other similar device, and which records a program code and/or a plurality of modules that can be executed by the processor 204.

The processor 204 may be coupled with the storage circuit 202, and the processor 204 may be, for example, a graphic processing unit (GPU), a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 204 may access the modules and/or the program codes stored in the storage circuit 202 to implement the image slice transforming method provided in the disclosure, which would be further discussed in the following.

Figure 3:
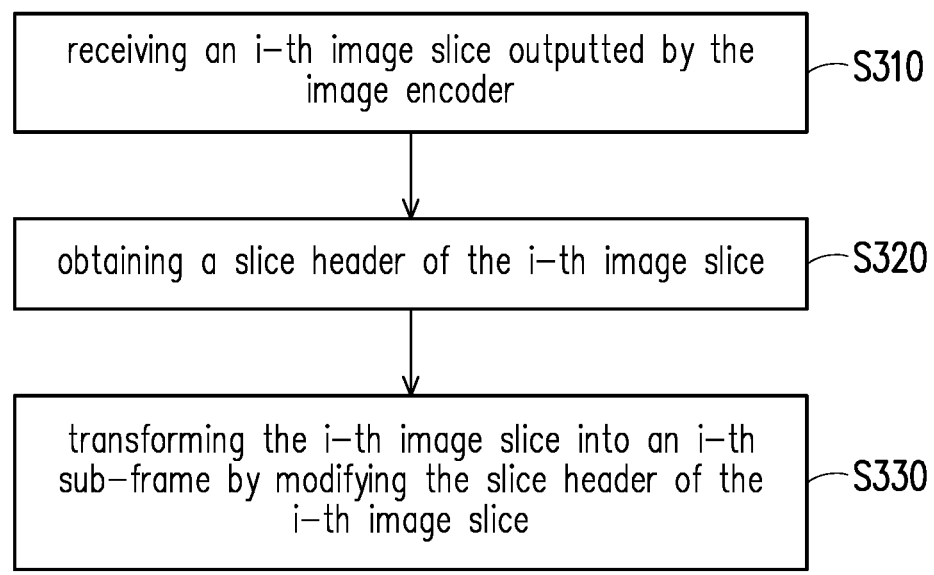
FIG. 3 shows a flow chart of the image slice transforming method according to an embodiment of the disclosure.

See FIG. 3, which shows a flow chart of the image slice transforming method according to an embodiment of the disclosure. The method of this embodiment may be executed by the electronic device 200 in FIG. 2, and the details of each step in FIG. 3 will be described below with the components shown in FIG. 2.

In one embodiment, an image frame may be divided into N image slices (N is an integer), and the image encoder may encode and output the image slices.

Accordingly, in step S310, the processor 204 receives an i-th image slice outputted by the image encoder, wherein i is an index.

In step S320, the processor 204 obtains a slice header of the i-th image slice. In one embodiment, since the image encoder is assumed to operate based on H.264, the i-th image slice may include a plurality of macro-blocks and a slice header. In one embodiment, the slice header of the i-th image slice may include a sequence parameter set and an initial macro-block index. Based on H.264, the initial macro-block index may be known as a variable named first_mb_in_slice, and the sequence parameter set may include a height parameter of the i-th image slice, which may be known as a variable named pic_height_in_map_units_minus1. The definitions of the sequence parameter set, the height parameter, and the initial macro-block index may be referred to the specification of H.264, which would not be provided herein.

In H.264, the receiver cannot perform decoding and/or rendering on any of the N image slices until all of the N image slices related to the image frame have been received. That is, the receiver one image slice cannot be individually decoded and/or rendered by the receiver, which increases the latency of video streaming. However, if one image slice may be modified to be regarded as an independent frame (which may be referred to as a sub-frame), the receiver may be allowed to decode/render the sub-frame individually.

Accordingly, in step S330, the processor 204 transforms the i-th image slice into an i-th subframe by modifying the slice header of the i-th image slice. In one embodiment, the processor 204 may modify the slice header of the i-th image slice by modifying the height parameter (i.e., pic_height_in_map_units_minus1) and the initial macro-block index (i.e., first_mb_in_slice) of the slice header of the i-th image slice.

In one embodiment, the processor 204 may modify the height parameter of the slice header based on a height of the i-th image slice and a size of the macro-blocks. In one embodiment, the processor 204 may divide the height of the i-th image slice with a height of one of the macro-blocks to obtain a quotient (referred to as Q). Next, the processor 204 may modify the height parameter of the slice header as Q−1.

For example, assuming that the height of the i-th image slice is 1600 pixels and the size of a macro-block is 16×16. In this case, the processor 204 may obtain a quotient of 100 by calculating 1600/16. Next, the processor 204 may modify the height parameter of the slice header as Q−1 (i.e., 99), but the disclosure is not limited thereto.

In one embodiment, the processor 204 may modify the initial macro-block index of the slice header as a predetermined index, which may be, for example, 0. In detail, based on H.264, the initial macro-block index is originally used to characterize the order of the first macro-block of the i-th image slice in the image frame. After modifying the initial macro-block index of the slice header of the i-th image slice to be 0, the i-th image slice may be regarded as an independent subframe. For better understanding the above concept, FIG. 4 would be used as an example.

Figure 4:
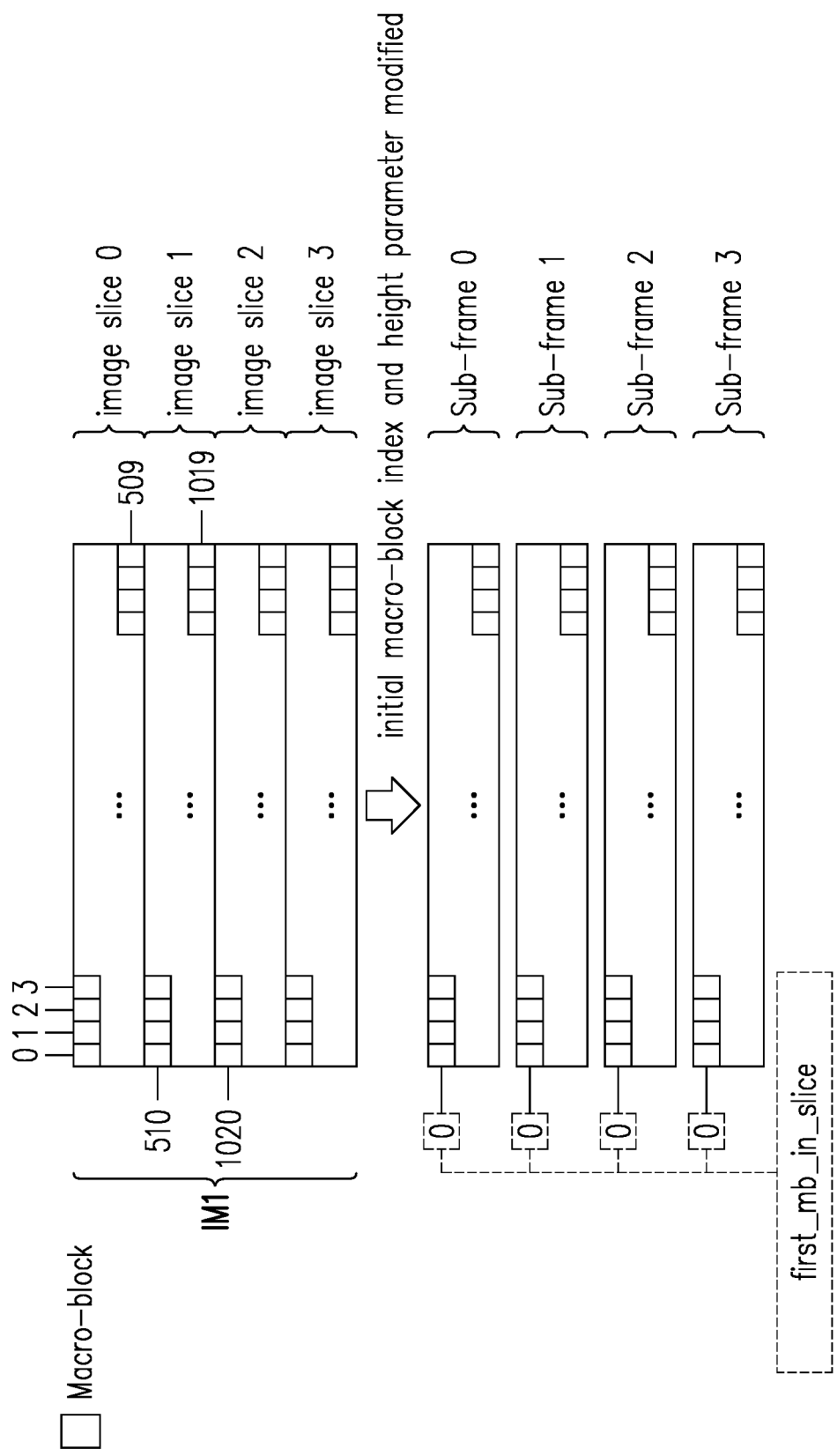
FIG. 4 shows a schematic diagram of modifying the initial macro-block indexes of slice headers according to an embodiment of the disclosure.

See FIG. 4, which shows a schematic diagram of modifying the initial macro-block indexes of slice headers according to an embodiment of the disclosure. In FIG. 4, an image frame IM1 may be divided into 4 image slices, i.e., image slice 0, image slice 1, image slice 2, and image slice 3, and each image slice may include 510 macro-blocks. For example, image slice 0 may include macro-block 0 to macro-block 509 of the image frame IM1, and image slice 1 may include macro-block 510 to macro-block 1019 of the image frame IM1. The order of the macro-blocks in image slice 2 and image slice 3 may be understood based on the above teachings, which would not be further provided.

Since the order of the first macro-block (i.e., macro-block 0) in image slice 0 is 0, the original value indicated by the initial macro-block index in the slice header of image slice 0 may be 0. Since the order of the first macro-block (i.e., macro-block 510) in image slice 1 is 510, the original value indicated by the initial macro-block index in the slice header of image slice 1 may be 510. Since the order of the first macro-block (i.e., macro-block 1020) in image slice 2 is 1020, the original value indicated by the initial macro-block index in the slice header of image slice 2 may be 1020.

In the scenario of FIG. 4, when the processor 204 receives image slice 0, the processor 204 may modify the initial macro-block index in the slice header of image slice 0 to be 0 and modify the height parameter to be the corresponding Q−1 such that image slice 0 with the modified header may be regarded as sub-frame 0. When the processor 204 receives image slice 1, the processor 204 may modify the initial macro-block index in the slice header of image slice 1 to be 0 and modify the height parameter to be the corresponding Q−1, such that image slice 1 with the modified header may be regarded as sub-frame 1. When the processor 204 receives image slice 2, the processor 204 may modify the initial macro-block index in the slice header of image slice 2 to be 0 and modify the height parameter to be the corresponding Q−1, such that image slice 2 with the modified header may be regarded as sub-frame 2. When the processor 204 receives image slice 3, the processor 204 may modify the initial macro-block index in the slice header of image slice 3 to be 0 and modify the height parameter to be the corresponding Q−1, such that image slice 3 with the modified header may be regarded as sub-frame 3.

Based on the above teachings, the processor 204 may transform the i-th image slice into the i-th sub-frame by modifying the slice header of the i-th image slice. In one embodiment, since the length of a sub-frame header is specified to be a predetermined length in the specification of H.264, the processor 204 may determine whether the length of the modified slice header of the i-th image slice meets the predetermined length. In one embodiment, in response to determining that a length of the modified slice header of the i-th image slice is shorter than the predetermined length, the processor 204 may adjust the length of the modified slice header of the i-th image slice to meet the predetermined length by padding the modified slice header with specific data bits (e.g., 0s). In this case, the i-th image slice with the modified and padded slice header may be regarded as the i-th sub-frame, but the disclosure is not limited thereto.

In one embodiment, when the electronic device 200 is implemented as the transmitter of the video streaming system, the electronic device 200 may transmit the i-th subframe to the receiver of the video streaming system. Since the i-th image slice has been transformed into the i-th sub-frame, the receiver of the video streaming system may decode the i-th sub-frame and render the decoded i-th sub-frame right after receiving the i-th sub-frame. That is, the receiver does not have to wait for other sub-frames related to the image frame to start decoding and rendering the i-th sub-frame. Since the receiver may start decoding the i-th sub-frame earlier, the latency of the receiver may be reduced.

In another embodiment, when the electronic device 200 is implemented as the receiver of the video streaming system, the electronic device 200 may decode the i-th sub-frame and render the decoded i-th sub-frame right after transforming the i-th image slice into the i-th sub-frame. Accordingly, the latency of the electronic device 200 may be reduced.

In other embodiments, the processor 204 may perform other operations similar to those provided in FIG. 3 to other image slices of the N image slices to transform these image slices into the corresponding sub-frames. For example, after receiving an (i+1)-th image slice of the N image slices from the image encoder, the processor 204 may obtain a slice header of the (i+1)-th image slice and transform the (i+1)-th image slice into an (i+1)-th sub-frame by modifying the slice header of the (i+1)-th image slice, and the details thereof may be referred to the above teachings, which would not be repeated herein.

In one embodiment, when the electronic device 200 is implemented as the receiver of the video streaming system, the electronic device 200 may determine whether the N image slices have been transformed into the corresponding N sub-frames and each sub-frame have been decoded and rendered. If yes, the processor 204 may merge the rendered sub-frames as a visual content and provide the visual content.

For example, assuming that the electronic device 200 is a head-mounted display used to provide virtual reality contents to the wearer thereof. In this case, the electronic device 200 may show the merged sub-frames as the visual content for the wearer to see. Since the electronic device 200 may operate with a lower latency, the user experience of the wearer may be improved accordingly.

In summary, the embodiments of the disclosure may transform each image slice into the corresponding sub-frame by modifying the slice header thereof. Since each sub-frame may be individually decoded and/or rendered, the receiver of the video streaming system does not have to wait for other sub-frames related to the image frame. Accordingly, the receiver may start decoding each sub-frame earlier, and hence the latency of the receiver may be reduced, which may improve the user experience accordingly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image slice transforming method, adapted to an electronic device, comprising:
   receiving an i-th image slice outputted by an image encoder, wherein the i-th image slice belongs to N image slices divided from an image frame, i is an index, and N is an integer, wherein the i-th image slice comprises a plurality of macro-blocks, the slice header of the i-th image slice comprises a height parameter and an initial macro-block index;
   obtaining a slice header of the i-th image slice;
   transforming the i-th image slice into an i-th sub-frame by modifying the slice header of the i-th image slice, comprising:
      modifying the height parameter of the slice header based on a height of the i-th image slice and a size of the macro-blocks; and
      modifying the initial macro-block index of the slice header as a predetermined index.

2. The method according to claim 1, wherein the step of modifying the height parameter of the slice header based on the height of the i-th image slice and the size of the macro-blocks comprises:
   dividing the height of the i-th image slice with a height of one of the macro-blocks to obtain a quotient, wherein the quotient is represented by Q; and
   modifying the height parameter of the slice header as Q−1.

3. The method according to claim 1, wherein the predetermined index is 0.

4. The method according to claim 1, wherein after the step of modifying the initial macro-block index of the slice header as the predetermined index, the method further comprises:
   in response to determining that a length of the modified slice header of the i-th image slice is shorter than a predetermined length, adjusting the length of the modified slice header of the i-th image slice to meet the predetermined length by padding the modified slice header with specific data bits.

5. The method according to claim 1, further comprising:
   receiving an (i+1)-th image slice of the N image slices from the image encoder;
   obtaining a slice header of the (i+1)-th image slice; and
   transforming the (i+1)-th image slice into an (i+1)-th sub-frame by modifying the slice header of the (i+1)-th image slice.

6. The method according to claim 5, further comprising:
   in response to determining that the N image slices have been transformed into N sub-frames and each sub-frame have been decoded and rendered, merging the rendered sub-frames as a visual content and providing the visual content.

7. The method according to claim 1, wherein the electronic device belongs to a video streaming system.

8. The method according to claim 7, wherein the electronic device is a transmitter of the video streaming system.

9. The method according to claim 7, wherein the electronic device is a receiver of the video streaming system, and the electronic device decodes the i-th sub-frame and renders the decoded i-th sub-frame.

10. An electronic device, comprising:
   a non-transitory storage circuit, storing a program code; and
   a processor, coupled to the non-transitory storage circuit, accessing the program code to perform:
      receiving an i-th image slice outputted by an image encoder, wherein the i-th image slice belongs to N image slices divided from an image frame, i is an index, and N is an integer, wherein the i-th image slice comprises a plurality of macro-blocks, the slice header of the i-th image slice comprises a height parameter and an initial macro-block index;
      obtaining a slice header of the i-th image slice;
      transforming the i-th image slice into an i-th sub-frame by modifying the slice header of the i-th image slice, comprising:
         modifying the height parameter of the slice header based on a height of the i-th image slice and a size of the macro-blocks; and
         modifying the initial macro-block index of the slice header as a predetermined index.

11. The electronic device according to claim 10, wherein when modifying the height parameter of the slice header based on the height of the i-th image slice and the size of the macro-blocks, the processor performs:
   dividing the height of the i-th image slice with a height of one of the macro-blocks to obtain a quotient, wherein the quotient is represented by Q; and modifying the height parameter of the slice header as Q–1.

12. The electronic device according to claim 10, wherein the predetermined index is 0.

13. The electronic device according to claim 10, wherein after modifying the initial macro-block index of the slice header as the predetermined index, the processor further performs:
   in response to determining that a length of the modified slice header of the i-th image slice is shorter than a predetermined length, adjusting the length of the modified slice header of the i-th image slice to meet the predetermined length by padding the modified slice header with specific data bits.

14. The electronic device according to claim 10, wherein the processor further performs:
   receiving an (i+1)-th image slice of the N image slices from the image encoder;
   obtaining a slice header of the (i+1)-th image slice; and
   transforming the (i+1)-th image slice into an (i+1)-th sub-frame by modifying the slice header of the (i+1)-th image slice.

15. The electronic device according to claim 14, wherein the processor further performs:
   in response to determining that the N image slices have been transformed into N sub-frames and each sub-frame have been decoded and rendered, merging the rendered sub-frames as a visual content and providing the visual content.

16. The electronic device according to claim 10, wherein the electronic device belongs to a video streaming system.

17. The electronic device according to claim 16, wherein the electronic device is a transmitter of the video streaming system.

18. The electronic device according to claim 16, wherein the electronic device is a receiver of the video streaming system, and the electronic device decodes the i-th sub-frame and renders the decoded i-th sub-frame.

\* \* \* \* \*